May 12, 1964     C. R. LANDMANN     3,133,182
HOT WATER HEATER

Filed Nov. 29, 1961     2 Sheets-Sheet 1

INVENTOR.
CHRISTOPHER R. LANDMANN
BY *Roy C. Hopgood*
ATTORNEY

May 12, 1964
C. R. LANDMANN
3,133,182
HOT WATER HEATER
Filed Nov. 29, 1961
2 Sheets-Sheet 2
FIG. 3
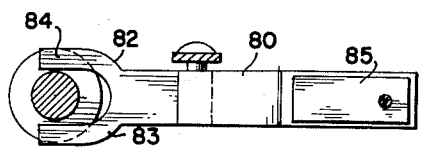
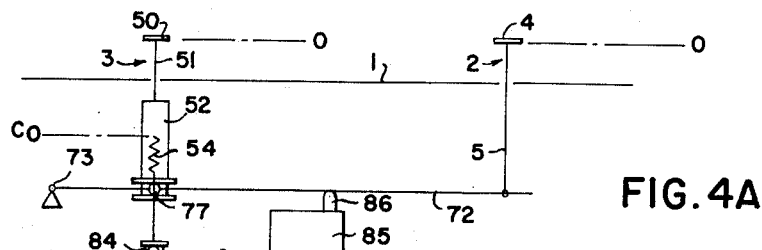
FIG. 4A
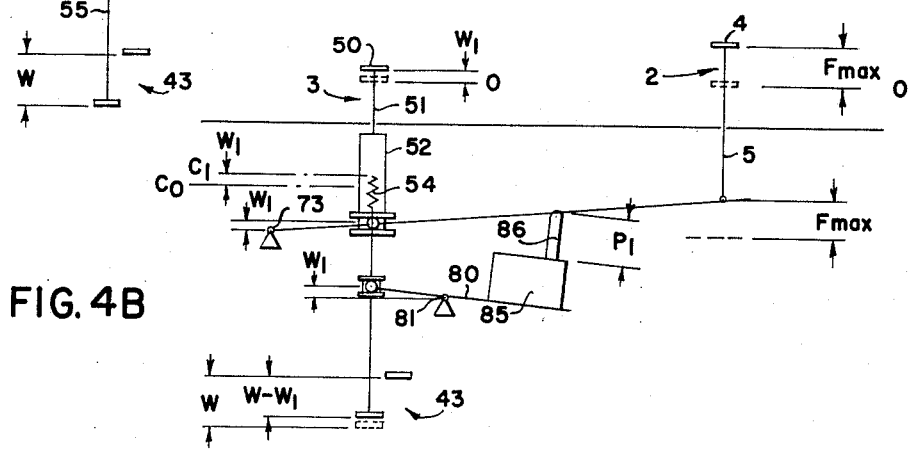
FIG. 4B
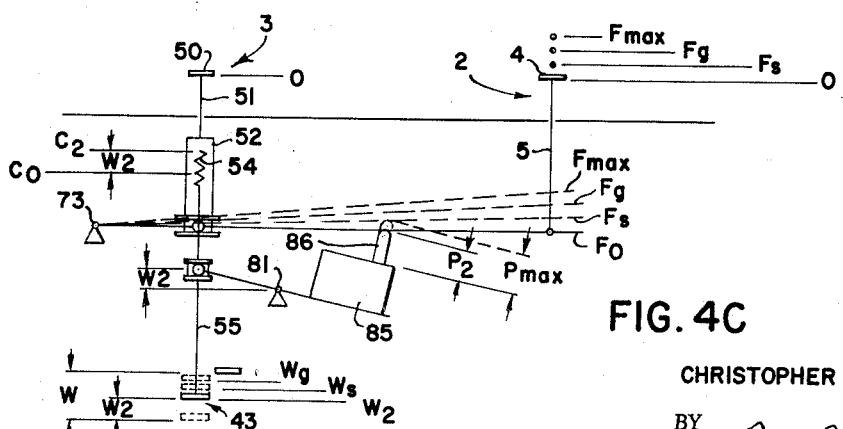
FIG. 4C
INVENTOR.
CHRISTOPHER R. LANDMANN
BY Roy C. Hopgood
ATTORNEY United States Patent Office 3,133,182
Patented May 12, 1964

3,133,182
HOT WATER HEATER
Christopher R. Landmann, 3 W. 73rd St.,
New York 23, N.Y.
Filed Nov. 29, 1961, Ser. No. 155,866
14 Claims. (Cl. 219—38)

This invention relates to an electrically heated, hot water system and more particularly relates to the type in which either hot or cold water can be supplied from one faucet through a single conduit or pipe.

In weekend homes, cottages, hunting lodges, service stations or the like, it is difficult and expensive to have a boiler or another type of external system to supply hot water.

For such applications, prior systems have been utilized which employ a small storage tank to contain heated water. The water in such tanks may be heated by conventional electrical heating means. However, such systems have the disadvantage of being limited to a relatively small capacity. As the water is removed from the storage tank, the temperature of the remaining volume of water is quickly reduced.

Other systems have utilized a transformer having the primary circuit coupled to a source of electrical energy and having the conduit through which the water flows formed into a plurality of turns to comprise the secondary circuit. The turns of the conduit form a coil which carries the electrical current to heat the water flowing within the said conduit. Pertinent systems are shown in U.S. Patents No. 1,402,021, No. 1,458,634 and No. 1,563,296.

In order to supply large amounts of current to the secondary to quickly heat the water, it has been recognized that the resistance of the secondary should be low and this secondary is shorted across its output points. I have recognized that it is also desirable to control the temperature at which the heated water will flow from the faucet and that it is also essential to effectively insulate the transformer and any means to control the temperature of the water from the person using the faucet. This is particularly important since the person who utilizes the faucet may have wet hands and cannot safely contact any part of the high voltage primary circuit of the transformer.

An object of this invention is to provide a safe, continuous hot water system which may quickly heat the water contained in a conduit.

Another object of this invention is to provide a safe system for heating water in which a conduit is formed into a plurality of turns as the secondary of the transformer and in which the control of the water temperature is effected in a safe and efficient manner.

Another object of this invention is to provide a safe system for heating water in which a conduit is formed into a plurality of turns as the secondary of the transformer and in which the control of the water temperature is effected in a safe and efficient manner by the use of a mechanical adjusting means.

A further object of this invention is to provide a safe means for controlling the temperature of water flowing through a conduit formed as the secondary of a transformer by varying through insulated means, the amount of magnetic flux flowing through said transformer.

A still further object of this invention is to provide a system for heating water in a conduit and reduce the electrical surge when the faucet is turned on and off.

Still another object of this invention is to provide a linkage in a system for heating water in a conduit utilizing said conduit as a secondary of a transformer. The armature passing through this conduit is movable when the faucet is turned on and off, but which armature is also movable to control the amount of flux flowing through the transformer circuit.

Yet another object of this invention is to provide a safe system for heating water to effect a booster for use in conjunction with conventional home heating systems.

Briefly, the foregoing objects of this invention are accomplished by providing a transformer, the secondary of which includes the conduit through which cold water flows. Part of this conduit is formed into a plurality of turns which turns are magnetically coupled to the primary of the transformer by a magnetic core. The primary is coupled to an electrical source through a switch. The output terminals of the secondary are shorted. The magnetic core of the transformer is further provided with a variable air gap the width of which may be varied to control the temperature of the heated water. A fixed air gap is provided in the magnetic core which acts as a shunt when the variable air gap is opened to aid in controlling the water temperature. A safety linkage is provided to prevent high surges in the switch when the water is initially allowed to flow.

The above-mentioned and other features and objects of this invention and the manner of attaining them will become more apparent and the invention itself will be best understood by reference to the following description of an embodiment of the invention taken in conjunction with the accompanying drawings, wherein:

FIG. 3 is a cross-sectional top view along 3—3 of FIG. 1.

FIGS. 4A, B, and C are schematic diagrams showing the relative positions of the control linkage.

*Water Flow Control*

Figure 1:
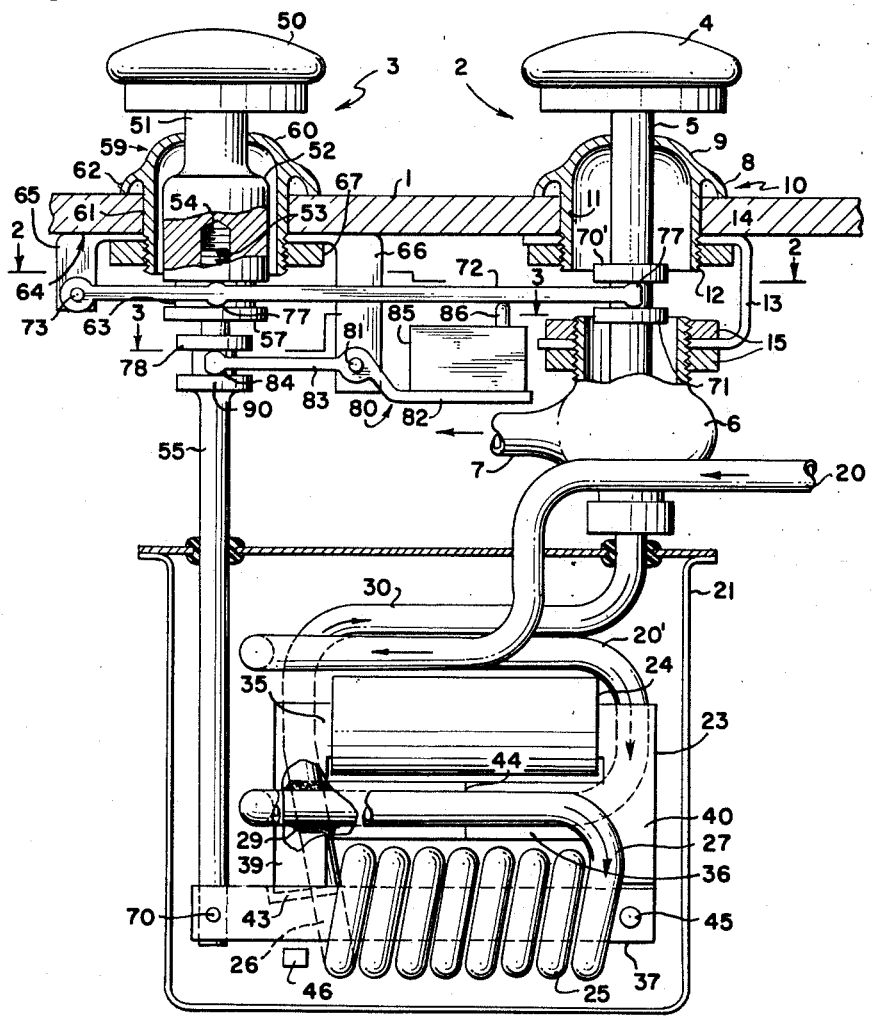
FIG. 1 shows a schematic diagram of the electrical heating system of this invention.

Referring now to FIG. 1 there is shown a support 1 which may be a basin having a plurality of apertures through which a water faucet 2 and the upper part of temperature control means 3 may be fitted. Faucet 2 comprises a knob 4 attached to a central shaft 5, the lower end of which is coupled to a valve means 6 which controls the flow of water through conduit 7 to the spout (not shown). The rotation of the knob 4 controls valve means 6.

Water faucet 2 is mounted on support 1 by means of a fitting 8 having a cap-like upper part 9 with sides 10 which are adapted to rest on support 1. A depending tubular stem 11 having an external thread 12 at its lower end extends downwardly from part 9. The outer diameter of stem 11 is approximately equal to the aperture in support 1. One leg of a U-shaped member 13 is fitted against the lower surface of support 1 and around stem 11. The faucet 2 and U-shaped member are locked in place by means of nut 14 which receives the threaded end of stem 11. The other leg of U-shaped member 13 has a central aperture through which part of valve means 6 passes and valve means 6 is locked on U-shaped member 13 by means of nuts 15 which receives a threaded upper part of valve means 6.

*Water Supply*

Water is supplied through conduit 20 which conduit enters an aperture in a housing 21. Located within housing 21 is a transformer 23 having primary and secondary circuits and associated armatures or magnetic core means. A conventional primary circuit is shown at 24. The secondary of transformer 23 consists of a part of conduit 20 which is formed into a plurality of turns 25. The outer ends 26 and 27 of the turns 25 constitute the output terminals of the secondary. Ends 26 and 27 are electrically connected together at 29 by a conductive strap or by a secure weld to form a shorted output. If desired, housing 21 may be filled with a fluid such as oil or suitable material to absorb some of the heat generated by the primary and armature which is then picked up by the preheat coils 20'. The end 26 of conduit 20 is coupled directly to valve 6 through a part of conduit 20 identified by numeral 30 and preferably, should have a secure connection to ground, which is afforded by water conduit 20.

*Temperature Control*

Transformer 23 comprises a magnetic circuit through which the magnetic flux induced by the current in the primary circuit passes. In the embodiment shown, the magnetic circuit comprises a top leg 35 which passes through the axis of the primary winding, a middle leg 36 and a bottom leg 37 which passes through the axis of turns 25 of the secondary. The transformer has left and right side members 39 and 40 which are attached to legs 35—37 serving to complete the magnetic circuit. Between the left member 39 and the bottom leg 37, there is provided a variable air gap 43, the width or spacing of which may be varied. In order to prevent hum, there may be provided a shorted coil (not shown) secured to one of the surfaces forming the variable air gap and positioned within the said air gap. A small fixed air gap 44 may be provided in middle leg 36 to place an upper limit on the intensity of flux induced and to facilitate the flux control provided by variable air gap 43. Aside from the fixed air gap 44 and the variable air gap 43 the magnetic circuit is substantially endless and continuous. The bottom leg 37 is pivotally mounted at pin 45 which connects to right member 40 and when rotated counterclockwise, increases the width of air gap 43. The lower surface of left side member may be tapered or specifically shaped to provide a desired rate of flux change as shown at 41 as may be the adjacent surface 42 of bottom leg 37. When the bottom leg is in its uppermost position, adjacent surfaces 41 and 42 rest against one another. When bottom leg 37 is lowered and pivoted about pin 45, the distance between surfaces 41 and 42 increases, increasing the width of the air gap. The bottommost position of air gap 43 may be fixed by positioning a stop 46 which limits the downward travel of bottom leg 37. The diameter of the inner periphery of turns 25 is such as to allow the pivotal movement of bottom leg 37. If desired, however, variable air gap 43 may be positioned at another part of the transformer core or magnetic circuit, preferably at a part adjacent turns 25. Further, the variation in air gap may be achieved by a sliding wedge, a rotating barrel shunt, a step shunt or other means which will occur to those skilled in the art. These other means may be actuated by suitable control means.

Temperature control 3 is mounted on support 1 by means of a fitting 59 having a cap-like upper part 60 with a depending tubular stem 61 having an external threading 62 at the lower end. An inverted U-shaped bracket 64 is mounted against the bottom of support 1 having a left side arm 65 and a right side arm 66 extending downwardly. A nut 67 receives the threading 62 and locks fitting 59 and 64 in place.

The lower end of shaft 55 is pivotally mounted to leg 37 at pin 70 to prevent shaft 55 from rotating on its axis when knob 50 is turned.

The movement of bottom leg 37 is controlled by rotation of knob 50 of temperature control 3. Knob 50 is coupled to a stub shaft 51 having an enlarged base 52. Base 52 has a threaded internal bore 53 to receive the upper end 54 of control shaft 55. As shown, the knob 50 and the shaft 55 are in the off position and air gap 43 is open. When knob 50 and stub shaft 51 are rotated, because of the threaded engagement at 52 and 53, shaft 55 is moved up or down. The up and down movement of shaft 55 necessarily effects the change in width of air gap 43.

Axially mounted on shaft 5 are a series of retaining elements 70' and 71 which may for example be collars integral with shaft 5.

Figure 2:
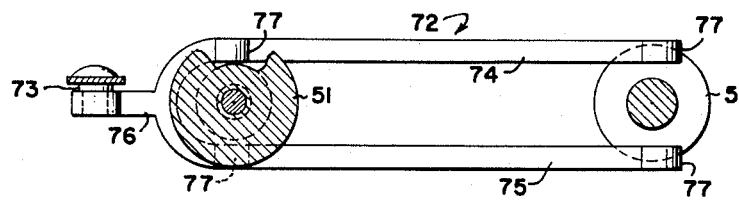
FIG. 2 is a cross-sectional top view along 2—2 of FIG. 4.

As shown in FIG. 2, lever 72 may be forked-shaped and comprises spreader arms 74 and 75 which fit against shafts 54 and 5 respectively. The left end 76 is pivotally mounted at pin 73. The arms 74 and 75 may have struck up portions 77 or bulges to provide more effective engagement with the contacting surfaces and to allow the contacting surfaces to rotate on the bulges so that lever 72 is not rotated.

Base 52 has a circumferential recess or groove 63 to receive a lever 72 the purpose of which will soon be explained. A flanged section 57 forms the bottom wall of groove 63 and supports the struck up portion 77. The entire control structure, including base 52, flange 57, control shaft 55 and its upper end 54 are floating and may move up and down within fitting 59 upon actuation by lever 72 when said lever exerts a force against the walls of groove 63. Further, rotation of knob 50 allows upper end 54 of control shaft 55 to move relative to base 52 and hence relative to lever 72. Recess 63 accommodates arms 74 and 75 of lever 72. Collars 78 and 90 are integral with shaft 55. Rotation of knob 4 or 50 will cause shafts 5 and 51 to rotate respectively but will not cause lever member 72 to rotate.

In the position shown, knob 4 is closed and shaft 5 is down. Valve 6 is closed. Temperature control knob 50 is off and shaft 55 is in its lowermost position, the air gap 43 being open. When knob 4 is rotated to open valve 6, shaft 5 will move vertically upwards in which case, collars 70' and 71 will force lever 72 in an upward direction pivoting about 73 and moving base 52 up proportionately.

A second lever 80 is pivotally mounted at pin 81 to the right arm 66 of the U-shaped bracket 64, the left side of which lever is coupled to the shaft 55 by means of arms 82 and 83 having struck up portions 84. Arms 82 and 83 are fastened to shaft 55 by means of a nut 78 and flange 90. If desired a clevis mounting may be used. The left end of lever 80 will move up and down as rod 55 moves pivoting about pin 81. As shown in FIG. 1, shaft 55 is down and air gap 43 is open, so that a space exists between the top surface of nut 78 and the bottom surface of flange 57.

The other end of lever 80 carries a switch 85 having an actuating projection 86 extending towards lever member 72. Switch 85 is connected in series with the source of electricity and the transformer primary. When plunger 86 is depressed, the switch is off and the transformer primary is disconnected.

When both knobs 4 and 50 are turned in an "on" direction, plunger 86 is allowed to rise permitting contacts of switch 85 to close and supply current to the primary. However, when either of the knobs 4 or 50 are in an "off" position (shaft 5 or 55 being in their lowermost position), plunger 86 contacts lever 72 and is depressed, switch 85 thereby being switched off.

The movements of levers 72 and 80 are so selected that:

(*a*) when temperature control knob 50 is off at its lowermost position, rotation of water faucet knob 4 to any position will not move shaft 5 upwards a sufficient amount to move lever 72 upwards to eliminate pressure against projection 86 to allow the contacts of switch 85 to close. This is necessary to allow cold water to flow when only cold water is wanted.

(*b*) when water faucet knob 4 is off, rotation of temperature control knob 50 to maximum on position will not be sufficient to move the left arm 83 of lever 80 upward and right arm 82 downward a sufficient amount so as to eliminate pressure against projection 86 to close switch 85. Thus, if no water flows, no electrical current will flow to the primary and the linkage is such that switch 85 is open, disconnecting the primary from the electrical source.

(c) the turning off of the temperature control knob, and/or the water faucet knob will effect an opening of the air gap before the contacts of switch 85 are opened.

Referring to FIG. 4A, there is shown diagrammatically the position of lever 72 corresponding to the conditions of FIG. 1. The water faucet knob is off and shaft 5 and lever 72 are in the off position. This position will be referred to as $F_0$, meaning zero flow. Plunger 86 of switch 85 is fully depressed and switch 85 is off, the contacts thereof being open. This position of the plunger will be referred to as $P_0$. The air gap 43 is fully open at a dimension W. End 54 of control shaft 55 is at a position $C_0$. The switch 85 is designed to allow plunger 86 to rise to a predetermined position $P_{max}$ before the contacts thereof will close.

Referring to FIG. 4B, there is shown diagrammatically the position of levers 72 and 80 with the water full on and the temperature control off so that cold water can flow. Shaft 5 and lever 72 are in their highest or $F_{max}$ position for maximum flow. The counterclockwise rotation of lever 72 about pivot 73 has caused base 52 hence control shaft 55 and end 54 to rise. The end 54 has risen to a position $C_1$ and the air gap has closed an amount $w_1$ so that the width of the gap is $W-w_1$. The right end of lever 80 has moved down because of the clockwise rotation about pivot 81. Hence, plunger 86 has risen to a position $P_1$. Although the plunger has risen, position $P_1$ is less than the critical $P_{max}$ so that the contacts of switch 85 are still open.

Referring now to FIG. 4C, which is a continuation of FIG. 4B, the temperature control knob is fully on. When water faucet 4 is now turned on, shaft 5 and lever 72 will rise to a position $F_s$ ($F_{switch}$). At this position, plunger 86 reaches $P_{max}$ and the contacts of switch 85 close. At this time, air gap 43 has closed a further amount to a position shown as $W_s$ on the drawing; that is, the air gap is still open so that switching occurs before air gap 43 is fully closed. When the water faucet is turned on further so that shaft 5 and lever 72 reach a position $F_g$, the air gap 43 assumes a position shown as $W_g$ or fully closed. The movement of shaft 5 from $F_g$ to $F_{max}$ does not affect the movement of shaft 55 since a certain amount of overtravel can be designed into the system.

When the water is turned off, it is necessary that the contacts of switch 85 be opened when the air gap 43 is not fully closed. If the temperature control knob is turned off first, it is clear that the air gap opens somewhat. If the water faucet is turned off first, the position $F_g$ will be reached before $F_s$ thereby opening the gap somewhat before switching. The relative positions, $F_{max}$, $F_g$, $F_s$, $C_0$, $W_1$, $W_s$, $W_g$ have been exaggerated for purposes of explanation and may be varied in accordance with design practice.

Further, while one particular control linkage is shown, other controls may be utilized to effect the switching characteristics set forth.

If desired, a fuse may be used to turn off the transformer when the heat generated exceeds a desired level. As an example, a switch which is responsive to temperature may be inserted in the primary circuit of the transformer. However, the temperature sensitive element which controls the switch should be placed adjacent to the secondary. Such a device may include an element the impedance of which decreases with an increase in the temperature of the environment. This impedance may be located physically adjacent to the secondary while the control switch is placed in series with the primary. Further, since the voltage across the secondary is small, for example, a few volts, a fuse pellet may be inserted in series with the secondary shorting strap to melt out in case of local overheating. In this event, the magnetic shunt means 44 will protect the primary.

If desired, the position of the turns of the secondary may be varied to improve the heat characteristics thereof, and while a conduit having a circular cross-section is used, a different cross-sectional shape may also be used. Other similar changes will occur to those skilled in the art.

In order to improve the power factor of the transformer, which may normally be relatively low because of the shorted secondary, a capacitor may be used across the primary of said transformer. Since, however, the capacity of such a capacitor may have to be quite large, necessitating a bulky unit, it is also possible to arrange for a third winding to be placed in the same armature core as the primary to act as a step-up auto transformer. A capacitor connected across this third winding may then be reduced in size compared with the capacitor required directly on the line in inverse proportion of the voltages of the primary and the said third winding.

Further, if desired, one or more of these heating units may be used throughout a building to heat water which may flow through to various locations or to heat water for heating parts of the building. Thus, there is provided a heating system which is easily made having wide applications especially for home use and in small commercial structures.

It is understood that certain changes in the embodiment shown may be made by those skilled in the art without departing from the spirit of my invention. For example, lever 80 may be eliminated and two normally off switches placed in series with the primary of the transformer and the power supply. The switches are coupled to the water faucet means and temperature control respectively and turn on when each is turned on. Lever 72 operates as described and closes gap 43 after the switch in the water faucet means is closed.

I claim:

1. A system for heating water and controlling the temperature thereof comprising
    a faucet means through which water may flow,
    a conduit connected to said faucet means,
    a transformer having a primary circuit,
    a part of said conduit being formed into a plurality of turns and forming the secondary of said transformer,
    said secondary of said transformer being shorted across its output terminals,
    said transformer having a magnetic core means passing through said primary and secondary of said transformer, said magnetic core having an air gap therein,
    temperature control means to control the width of said air gap,
    and switching means to energize said transformer, and coupling means coupled to said faucet means, said control means and said switching means to switch said switching means when said faucet means is on and when said control means is at a position at which the air gap is not fully closed, whereby the temperature of the water in said conduit is controlled and switching occurs when the magnetic flux is not at a maximum.

2. An apparatus for supplying hot and cold water comprising a single conduit connected to a source of cold water,
    a support,
    a water flow control means mounted on said support and connected to said conduit,
    a temperature control means mounted on said support,
    said water flow control means comprising a knob and a central shaft connected thereto for rotation thereof,
    a valve in said water flow control means being actuated in response to the movement of said shaft,
    linkage means comprising a lever member attached to said shaft and movable in a first and opposite direction, said temperature control means comprising a knob and a second central shaft, said second shaft having an internal thread at its lower end on the internal surface thereof, a control shaft mounted in said thread in threaded engagement whereby upon rotation of said knob of said temperature control means, said control shaft may be moved a second and opposite direction, a second lever, one end of said second lever being in operative engagement with said control shaft, the other end of said second lever carrying a switch mounted a predetermined distance from said first lever member, said switch having an actuating element facing said first lever member and responsive to the movement thereof, a housing comprising a transformer having a primary, said conduit being formed into a plurality of turns, said turns forming a secondary of said transformer, said switch being in the primary circuit, said secondary being shorted at its output terminals, a substantially endless magnetic core circuit means coupled through said primary and secondary circuits, part of said magnetic core circuit means being movable relative to the remainder of said magnetic core circuit and defining an air gap between the adjacent face of said movable part and the said remainder, and means coupled to said control shaft and responsive to movement of said control shaft to move said movable part of said magnetic core circuit and vary the spacing of said air gap, whereby the temperature of the water may be varied.

3. An apparatus for supplying hot and cold water comprising a single conduit connected to a source of cold water, a support, a water flow control means mounted on said support and connected to said conduit, a temperature control means mounted on said support, said water flow control means comprising a knob and a central shaft connected thereto for rotation thereof, a valve in said water flow control means being actuated in response to the movement of said shaft, said temperature control means comprising a knob and a second central shaft, said second shaft having an internal bore at its lower end on the internal surface thereof, linkage means comprising a first lever member attached to said first and second shafts and movable in up and down direction, a control shaft mounted in said bore in threaded engagement whereby upon rotation of said knob of said temperature control means, said control shaft may be moved up and down, a second lever, one end of said second lever being in operative engagement with said control shaft, the other end of said second lever carrying a switch mounted a predetermined distance from said first lever member, said switch having an actuating element facing said first lever member and responsive to movement thereof, a housing comprising a transformer having a primary, said conduit being formed into a plurality of turns, said turns forming a secondary of said transformer, said switch being in the primary circuit said secondary being shorted at its output terminals, substantially endless magnetic core circuit means coupled through said primary and secondary circuits, part of said magnetic core circuit means being movable relative to the remainder of said magnetic core circuit and defining an air gap between the adjacent face of said movable part and the said remainder, and means coupled to said control shaft and responsive to movement of said control shaft to move said movable part of said magnetic core circuit and vary the spacing of said air gap, whereby the temperature of the water may be varied.

4. The system of claim 1 further including linkage means to control the energization and deenergization of said primary including said switching means coupled to said primary to open and close said primary and said coupling means including lever means responsive to said water faucet means and said temperature control means to switch said switching means.

5. The system of claim 4 in which said water faucet means may be varied in position when said temperature control means is off without said lever means switching said switch means.

6. The system of claim 4 in which said water faucet means includes a first shaft means adapted to move in response to movement of said water faucet means, and said temperature control means includes a second shaft means adapted to move in response to movement of said temperature control means, said magnetic core having a movable part defining one boundary of said air gap, said second shaft means being coupled to the said movable part of said magnetic core means and adapted to control the movement thereof, said first shaft means being coupled to said movable part of said magnetic core means to exert a partial control on the movement thereof.

7. The system of claim 4 in which said water faucet means includes a first shaft means adapted to move in response to movement of said water faucet means, and said temperature control means includes a second shaft means adapted to move in response to movement of said temperature control means, said magnetic core having a movable part defining one boundary of said air gap, said second shaft means being coupled to the said movable part of said magnetic core means and adapted to control the movement thereof, said first shaft means being coupled to said movable part of said magnetic core means to exert a partial control on the movement thereof, and said lever means of said linkage means includes a first lever means coupled to said first and second shaft means and positioned substantially adjacent said switching means whereby upon the movement of said first and second shaft means a sufficient distance the position of said switching means may be varied and a second lever means coupled to said second shaft means and adapted to move in response to the movement of said second shaft means, said second lever means carrying said switching means, said second lever means being movable in a direction to move said switching means towards or away from said first lever means.

8. The system of claim 7 in which said temperature control means carries a bracket having two depending legs, said first lever means being pivoted on one of said legs and said second lever means being pivoted on the other of said legs, said legs being positioned on opposite sides of said second shaft means, whereby upon movement of said second shaft means said second lever means will be pivoted in one direction while said second lever means at the part carrying said switching means will be pivoted in reverse direction.

9. The system as defined in claim 8 in which the opposite end of said first lever means is directly coupled to said first shaft means and the movement of said water faucet means will move said first shaft means and thereby said end of said first lever means a predetermined maximum distance,
  said distance being insufficient to switch said switching means when said temperature control means is in the off position.

10. The system as defined in claim 9 in which said first and second lever means are pivoted so as to move a sufficient distance to close said switching means upon the movement of said temperature control means when said water faucet means has been turned on a predetermined amount,
  whereby when said water faucet means is turned on and said temperature control means is turned on thereafter, said switching will close before said temperature control means reaches its maximum on position,
  and thereby said switch means closes before said air gap is fully closed.

11. The system of claim 1 in which said magnetic core means includes a fixed shunting air gap.

12. A system for supplying hot and cold water comprising
  a single conduit connected to a source of cold water,
  means coupled to said conduit to discharge water,
  a transformer having a primary circuit,
  said conduit at a part thereof being formed into a plurality of turns to form the secondary circuit of said transformer,
  said secondary being shorted across the output terminals thereof,
  said primary circuit and secondary circuit being magnetically coupled by magnetic core means,
  whereby, when said primary is energized, a magnetic flux will form in said magnetic core means,
  said magnetic core means having an air gap therein,
  movable means for said air gap to adjust the width of said air gap,
  and temperature control means coupled to said movable means to move and adjustably control the width of said air gap, and further including
  water flow control means coupled to said conduit to control the flow of water,
  switching means to energize said transformer,
  and coupling means coupled to each of said water flow control means,
  temperature control means and said switch means to switch said switching means only when said water control means is on to allow flow and when said temperature control means is at a position at which the air gap is not fully closed.

13. A system for supplying hot and cold water comprising a single conduit connected to a source of cold water, means coupled to said conduit to discharge water,
  a transformer having a primary circuit,
  said conduit at a part thereof being formed into a plurality of turns to form the secondary circuit of said transformer,
  said secondary being shorted across the output terminals thereof,
  said primary circuit and secondary circuit being magnetically coupled by magnetic core means,
  whereby, when said primary is energized, a magnetic flux will form in said magnetic core means,
  movable means having minimum, maximum and varying inbetween positions for adjustably varying the intensity of the magnetic flux in said magnetic core means from a minimum to a maximum,
  water flow control means coupled to said conduit to control the flow of water having an off and maximum on positions,
  switching means to energize said transformer,
  and coupling means coupled to each of said water flow control means, movable means and switching means to switch said switching means when said water control means is on and when said movable means is at one of said varying inbetween positions, whereby switching occurs when the magnetic flux is not at a maximum.

14. The system of claim 13 in which said coupling means couples the water flow control means to said movable means to control the position of said movable means to a predetermined position, whereby said predetermined position varies the current when said transformer is energized.

References Cited in the file of this patent
UNITED STATES PATENTS

| | | |
|---|---|---|
| 381,815 | Ries | Apr. 24, 1888 |
| 400,515 | Thomson | Apr. 2, 1889 |
| 570,077 | Wetmore et al. | Oct. 27, 1896 |
| 891,657 | Berry | June 23, 1908 |
| 1,378,151 | Thordarson | May 17, 1921 |
| 1,458,634 | Waage | June 12, 1923 |
| 1,962,842 | Root | June 12, 1934 |
| 2,616,022 | Arnaud | Oct. 28, 1952 |

FOREIGN PATENTS

| | | |
|---|---|---|
| 1,094,408 | France | Dec. 8, 1954 |